July 18, 1961  R. H. KATZENBERGER  2,992,569
VIBRATION DAMPER ASSEMBLY
Filed July 22, 1960

INVENTOR.
RALPH H. KATZENBERGER
BY
Lockwood, Woodard, Smith & Weikart
ATTORNEYS

United States Patent Office 2,992,569
Patented July 18, 1961

2,992,569
VIBRATION DAMPER ASSEMBLY
Ralph H. Katzenberger, Indianapolis, Ind., assignor to Schwitzer Corporation, Indianapolis, Ind., a corporation of Indiana
Filed July 22, 1960, Ser. No. 44,753
5 Claims. (Cl. 74—574)

This invention relates generally to vibration dampers and more particularly it relates to torsional vibration dampers of the type adapted to be mounted on the end of the crankshaft of a reciprocating engine.

Conventional dampers of this character comprise two concentric members, the inner one of which may be attached to and driven from the engine crankshaft and the outer one of which may be a driven inertia member held in contact with the driving member by means of an elastic element. The elastic element may be precompressed on to the central driving member or may be bonded or otherwise adhered to both the central driving member and the driven inertia member. The elastic element or elastomer is used for tuning the assembly to the engine in such a manner that the elastomer absorbs portions of the vibrational energy created by the engine.

If there are large axial forces present which act in a plane displaced 90° relative to the rotational plane of the damper, dampers of the conventional type as described above may become defective in that the outer driven inertia member can slip axially from its postion relative to the inner driving member. This may cause breaking or bending of its retaining devices or breaking or tearing of the metal-to-rubber bond. These axial forces can be created by fore and aft vibration of the engine, or fore and aft inertia forces of the engine caused by stopping and starting the propelled vehicle, or gyroscopic effects caused by the cyclic bending of the crankshaft, or combination of these forces and effects. Another possible cause of such axial forces may be spring motion of the vehicle which changes the gyroscopic plane of the engine and the damper. Some dampers are provided with pulley grooves in the driven inertia member and misalignment of associated drive belts can also cause such axial forces.

In order to prevent axial slipping of the driven inertia member relative to the driving member, elastomers having cross-sections in the form of a U, an inverted U, L, or J have been proposed. These shapes, however, complicate the molding process of the elastomer and the manufacture of the driving and driven members, and substantially raise unit costs.

Where bonding of the elastic element to the metal parts has been relied upon to prevent axial slipping, there is undesirable limitation of the physical properties of the elastic member. Also the assembly process becomes complex and unit costs are raised to a substantial degree.

The principal object of this invention is to provide an efficient torsional vibration damper having a structure such that torsional vibration stresses throughout the elastomer will be substantially equal.

Another object of this invention is to provide a torsional vibration damper having structure adapted to provide positive resistance to axial forces which may cause relative axial movement between the driving and driven members.

It is another object of this invention to provide a torsional vibration damper which is preserved from detrimental effects of axial forces between the components.

In accordance with this invention, there is provided a torsional vibration damper having an inner driving member which has a pair of coaxial and intersecting concave peripheral surfaces. An outer driven member is disposed coaxially with the inner member and has a pair of convex intersecting coaxial inner surfaces opposed to the concave peripheral surface of the inner member, and spaced therefrom. An annular elastic member having a cross section corresponding to the space between the outer and inner members is disposed in the space between these members. The elastic member provides the only fastening means between the inner and outer members.

The full nature of the invention will be understood from the accompanying drawings and the following description and claims:

Figure 1:
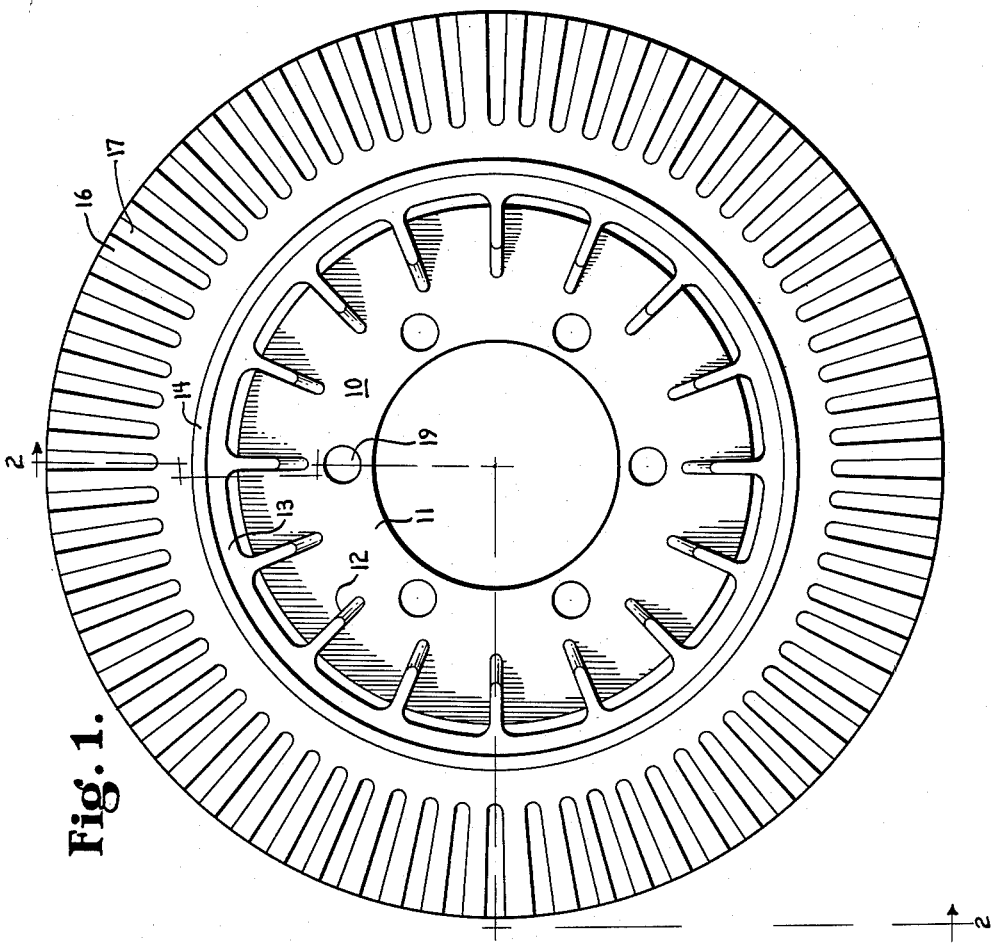
FIG. 1 is a front elevation of a damper assembly according to the present invention.

In the embodiment of the invention illustrated in FIG. 1 there is shown an inner member 10 having a flange portion 11 with apertures 19 by means of which it can be mounted to a flange of a rotating member such as the shaft of a reciprocating engine. There is a rim portion 13 which is connected to the flange 11 concentrically therewith by means of the ribs 12. An elastic member 14 is disposed in a radial space between the rim 13 and the outer (inertia) member 16 to effect a vibration damping connection between the inner and outer members. The outer members 16 has a series of radial grooves 17 disposed around its front and rear faces.

Figure 2:
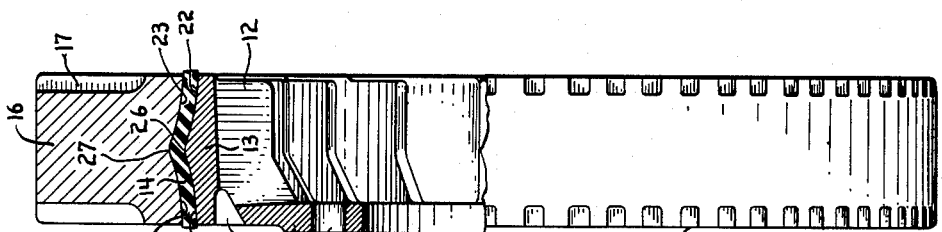
FIG. 2 is a cross section of the damper assembly taken on the line 2—2 of FIG. 1.
Figure 3:
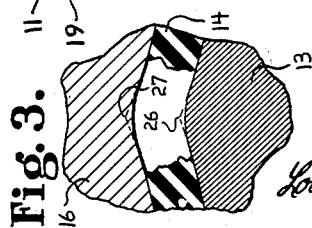
FIG. 3 is an enlarged fragmentary view of the juncture of surfaces 21—22 and surfaces 23—24 illustrated in FIG. 2.

Referring to FIG. 2, rim 13 of the inner member has an outer margin defined by the concave surfaces 21 and 22 which would intersect each other in a circle through the point 26. The outer member 16 has an inner margin defined by the convex surfaces 23 and 24 which would intersect each other in a circle passing through the point 27. To eliminate excessive stress at points 26 and 27 and the consequent generation of heat at these points, the surfaces 21, 22, 23 and 24 are curved at their repective junctures as indicated particularly in FIG. 3 so that there can be no sharp points 26 and 27.

The resilient member 14, which is usually made of rubber, may be incorporated between the inner member 10 and the outer member 16 by any of the means well known in the art and is preferably disposed in the space between the members in a state of radial compression. The shape or curvature of the concave and convex surfaces is such that the torsional forces existing between the inner member and outer member produce a substantially uniform torsional stress throughout the resilient member. Also, the curvature is such that axial forces existing between inner and outer members produce compression of the resilient member, thus minimizing shear stresses due to axial forces. The maximum diameter of the outer margin of the inner member is usually made slightly less than the minimum diameter of the outer member so that the parts may be readily assembled.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. A vibration neutralizing device comprising an inner annular member having an axis and an outer surface formed to provide a centrally disposed ridge with diverging concave surfaces of revolution about said axis, said concave surfaces sloping away from each side of said ridge, an outer annular member disposed concentrically of said inner member and having an inner side disposed opposite the concave surfaces of said inner member, said inner side having an annular grooved surface spaced from and facing the surface of said inner member, said grooved surface including convex portions facing the concave surfaces of said inner member, and a resilient member disposed between the convex surfaces and the concave surfaces.

2. A torsional vibration damper for a reciprocating engine comprising: an annular driving member having an outer peripheral surface comprising diverging concave surfaces joined to one another by a curved surface portion, a driven inertia member disposed concentrically of said driving member and having an inner surface radially spaced from the outer surface of said driving member and having diverging convex surfaces facing the outer surface of said driving member, said diverging convex surfaces being joined by a curved surface portion, and a resilient member interposed in the space between said outer surface and said inner surface.

3. A torsional vibration damper comprising: an inner member having an annular rim, a flange located concentrically with said rim and including ribs for supporting said rim, said rim having an outer surface defined by a pair of diverging concave surfaces, an annular inertia member having an inner surface spaced from the outer surface of said inner member, said inner surface comprising diverging convex surfaces, and a resilient member interposed between said concave surfaces and said convex surfaces.

4. The vibration damper of claim 3 wherein said ribs extend axially from said flange and radially from their axially extending portion to join said rim.

5. The damper of claim 3 wherein the innermost margin of said rim is disposed at a greater diameter than the outermost margin of said flange.

References Cited in the file of this patent

UNITED STATES PATENTS

| | | |
|---|---|---|
| 1,978,199 | Harris | Oct. 23, 1934 |
| 2,594,555 | Hardy | Apr. 29, 1952 |
| 2,716,904 | Schuldt | Sept. 6, 1955 |
| 2,861,472 | Hansz | Nov. 25, 1958 |

FOREIGN PATENTS

| | | |
|---|---|---|
| 820,042 | Great Britain | Sept. 16, 1959 |